US010423249B2

(12) United States Patent
Xu

(10) Patent No.: US 10,423,249 B2
(45) Date of Patent: Sep. 24, 2019

(54) INFORMATION PROCESSING METHOD AND ELECTRONIC DEVICE

(71) Applicant: Lenovo (Beijing) Co., Ltd., Beijing (CN)

(72) Inventor: Ben Xu, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 595 days.

(21) Appl. No.: 14/711,187

(22) Filed: May 13, 2015

(65) Prior Publication Data

US 2016/0188024 A1 Jun. 30, 2016

(30) Foreign Application Priority Data

Dec. 29, 2014 (CN) .......................... 2014 1 0836649
Dec. 29, 2014 (CN) .......................... 2014 1 0849678

(51) Int. Cl.
G06F 3/0487 (2013.01)
G06F 3/041 (2006.01)
G06F 1/16 (2006.01)

(52) U.S. Cl.
CPC ............ G06F 3/041 (2013.01); G06F 1/1652 (2013.01); G06F 3/0487 (2013.01); G06F 2203/04102 (2013.01); G06F 2203/04105 (2013.01)

(58) Field of Classification Search
CPC ......... G06F 1/1652; G06F 2203/04102; G06F 3/041; H04M 1/0268
See application file for complete search history.

(56) References Cited

U.S. PATENT DOCUMENTS

| 7,456,823 | B2 * | 11/2008 | Poupyrev | G06F 3/011 178/18.06 |
| 8,082,003 | B2 | 12/2011 | Jee | |
| 8,553,008 | B2 * | 10/2013 | Cho | G06F 3/0488 345/173 |
| 8,581,859 | B2 | 11/2013 | Okumura et al. | |
| 8,988,381 | B1 * | 3/2015 | Kim | G06F 1/1652 345/108 |
| 9,204,304 | B2 | 12/2015 | Mao et al. | |
| 9,886,187 | B2 * | 2/2018 | Seo | G06F 3/041 |

(Continued)

FOREIGN PATENT DOCUMENTS

| CN | 101640712 A | 2/2010 |
| CN | 102999155 A | 3/2013 |

(Continued)

OTHER PUBLICATIONS

First Chinese Office Action regarding Application No. 201410849678.7 dated Feb. 20, 2017. English translation provided by Unitalen Attorneys at Law.

(Continued)

Primary Examiner — Chanh D Nguyen
Assistant Examiner — Karin Kiyabu
(74) Attorney, Agent, or Firm — Harness, Dickey & Pierce, P.L.C.

(57) ABSTRACT

An information processing method and an electronic device are provided according to the disclosure. The method includes: determining first deformation information corresponding to a first deformation; generating a first instruction corresponding to the first deformation information; and executing the first instruction.

16 Claims, 7 Drawing Sheets

(56) References Cited

U.S. PATENT DOCUMENTS

| | | | |
|---|---|---|---|
| 10,061,471 B2* | 8/2018 | Lee | G06F 3/04817 |
| 10,152,088 B2* | 12/2018 | Ka | G06F 3/0483 |
| 2010/0029327 A1 | 2/2010 | Jee | |
| 2010/0164888 A1 | 7/2010 | Okumura et al. | |
| 2012/0313862 A1 | 12/2012 | Ko et al. | |
| 2013/0215011 A1 | 8/2013 | Ke | |
| 2013/0215088 A1* | 8/2013 | Son | G09G 5/40 345/204 |
| 2013/0265257 A1 | 10/2013 | Jung et al. | |
| 2013/0265260 A1* | 10/2013 | Seo | G06F 3/041 345/173 |
| 2013/0265262 A1* | 10/2013 | Jung | G06F 3/041 345/173 |
| 2013/0296000 A1* | 11/2013 | Park | G09G 3/001 455/566 |
| 2013/0300686 A1 | 11/2013 | Yoon et al. | |
| 2013/0321260 A1 | 12/2013 | Joo | |
| 2013/0321340 A1* | 12/2013 | Seo | G06F 1/1641 345/174 |
| 2014/0028596 A1* | 1/2014 | Seo | G06F 3/0487 345/173 |
| 2014/0029017 A1 | 1/2014 | Lee et al. | |
| 2014/0120891 A1* | 5/2014 | Chen | H04W 4/001 455/418 |
| 2014/0220959 A1 | 8/2014 | Mao et al. | |
| 2015/0185944 A1* | 7/2015 | Magi | G06F 1/1652 345/174 |
| 2015/0227173 A1* | 8/2015 | Hwang | G06F 1/1652 345/619 |
| 2016/0026219 A1 | 1/2016 | Kim et al. | |

FOREIGN PATENT DOCUMENTS

| | | |
|---|---|---|
| CN | 103258491 A | 8/2013 |
| CN | 103389865 A | 11/2013 |
| CN | 103455255 A | 12/2013 |
| CN | 103902854 A | 7/2014 |
| CN | 104220963 A | 12/2014 |
| EP | 2202624 A2 | 6/2010 |
| EP | 2533233 A | 12/2012 |

OTHER PUBLICATIONS

First Chinese Office Action regarding Application No. 201410836649.7 dated Feb. 28, 2017. English translation provided by Unitalen Attorneys at Law.

* cited by examiner

# INFORMATION PROCESSING METHOD AND ELECTRONIC DEVICE

The present application claims the priority to Chinese Patent disclosure No. 201410836649.7, entitled as "CONTROL METHOD AND CONTROL APPARATUS", filed on Dec. 29, 2014 with State Intellectual Property Office of People's Republic of China, which is incorporated herein by reference in its entirety.

The present application claims the priority to Chinese Patent disclosure No. 201410849678.7, entitled as "INFORMATION PROCESSING METHOD AND ELECTRONIC DEVICE", filed on Dec. 29, 2014 with State Intellectual Property Office of People's Republic of China, which is incorporated herein by reference in its entirety.

TECHNICAL FIELD

The disclosure relates to the technical field of computers, and in particular to an information processing method and an electronic device.

BACKGROUND

With the continuous development of science and technology, the electronic technology also is advanced rapidly, and there are increasing kinds of electronic products. In order to meet people's operational requirement of the electronic device, presently electronic devices with a flexible screen are developed, such as a mobile phone with a flexible screen, a smart bracelet with a flexible screen, and so on.

Compared with the conventional screen, the flexible screen is thinner and lighter in size and the power consumption of the flexible screen is less than the conventional screen; also, the durability of the flexible screen is greater than that of the conventional screen thanks to the bendable and good flexible characters of the flexible screen. Thanks to these advantages of the flexible screen, the flexible screen is widely applied to a new-generation intelligent electronic device, such as the mobile phone with the flexible screen, and thus the battery performance of the electronic device may be improved greatly, a probability of accidental damage for the electronic device may be reduced as far as possible and the service life is extended. Thanks to the bendable character, more possible operating modes may be provided for the electronic device with the flexible screen, thereby enhancing the entertainment and operability.

In the case that the user uses the device with the flexible screen (such as the mobile phone with the flexible screen), the user needs to operate the device like operating the conventional electronic device, to achieve some functions. For example, when the use needs to return to a main menu from an application interface directly, generally the user needs to touch a HOME key on the mobile phone to return to the main menu directly. For another example, when the user needs to turn up the volume of the mobile phone, generally the user needs to press a volume-up key of the mobile phone to increase the volume. When some functions are achieved by the user using the flexible electronic device, the user may also need to operate a certain key, to allow the flexible electronic device to achieve a certain function. Single interactive mode is provided by the flexible electronic device for the user, and the operability of the flexible electronic device is poor. Particularly, when a malfunction occurs to a key, the normal use of the flexible electronic device by the user is affected and it is inconvenient for the user.

SUMMARY

An information processing method and an electronic device are provided according to embodiments of the disclosure, to solve technical issues that single interactive operation mode and poor operability are provided by a flexible electronic device for the user.

In an aspect, an information processing method is provided according to an embodiment of the disclosure. The method includes:

determining first deformation information corresponding to a first deformation;

generating a first instruction corresponding to the first deformation information; and executing the first instruction.

In another aspect, an electronic device capable of being deformed under stress is provided, the electronic device include:

a first processing unit configured to determine first deformation information corresponding to a first deformation;

a second processing unit configured to generate a first instruction corresponding to the first deformation information; and a third processing unit configured to executing the first instruction.

In the embodiments of the disclosure, once it is detected that a first deformation occurs in the electronic device, the electronic device determines first deformation information corresponding to the first deformation, determines a first instruction corresponding to the first deformation information from multiple predetermined instructions, and executes the first instruction to achieve a function. That is, the electronic device can achieve a function directly based on the first deformation. For example, the electronic device may return to a main menu directly based on the first deformation; for another example, the electronic device may increase the volume directly based on the first deformation. In such way, the intelligence and operability of the electronic device is enhanced, and the electronic device may provide the user with a simple and interesting interactive operating mode based on the deformable character of itself, thereby improving the use experience of the user.

Moreover, since the functions being the same as that of physical keys or touch-control keys on the conventional electronic device may be achieved directly based on the deformation, no or least physical key (or touch-control key) is needed to be provided for the electronic device, and thus the expense of opening mould for providing physical keys may be reduced and the production cost is reduced. Additionally, since no or least key is provided on the surface of the electronic device, physical space inside the electronic device is saved to accommodate other functional components and thus more functions may be achieved by the electronic device. Also, the integration of the electronic device may be improved to prevent dust from entering into the electronic device, and the user's requirement for surface aesthetics may be satisfied.

Furthermore, when the user desires to achieve a certain function by the electronic device, the user just needs to operate the electronic device directly to make a deformation occur in the electronic device accordingly. Therefore, the operations operated by the user are simplified, and the quality and speed of information interaction between the user and the electronic device is improved.

BRIEF DESCRIPTION OF THE DRAWINGS

In order to illustrate the technical solutions according to the embodiments of the disclosure or in the conventional technology more clearly, the drawings to be used in the description of the conventional technology or the embodiments are described briefly hereinafter. Apparently, the drawings described hereinafter are only for some embodiments of the present disclosure, and other drawings may be obtained by those skilled in the art according to those drawings without creative effort.

DETAILED DESCRIPTION

Figure 1:
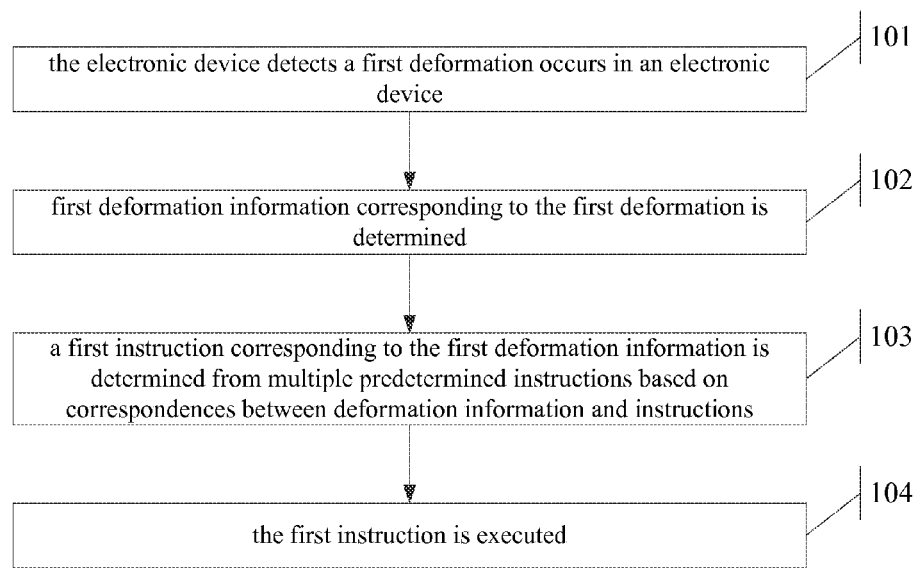
FIG. 1 is a main flowchart of an information processing method according to an embodiment of the disclosure.

An information processing method is provided according to embodiments of the disclosure, which is applied to an electronic device capable of being deformed under stress. The method include: detecting a first deformation occurs in the electronic device; determining first deformation information corresponding to the first deformation; determining a first instruction corresponding to the first deformation information from multiple predetermined instructions based on correspondences between deformation information and the instructions; and executing the first instruction.

In the embodiments of the disclosure, once it is detected that a first deformation occurs in the electronic device, the electronic device determines first deformation information corresponding to the first deformation, determines a first instruction corresponding to the first deformation information from multiple predetermined instructions, and executes the first instruction to achieve a certain function. That is, the electronic device may achieve a function directly based on the first deformation. For example, the electronic device may return to a main menu directly based on the first deformation; for another example, the electronic device may increase the volume directly based on the first deformation. In such way, the intelligence and operability of the electronic device is enhanced, and the electronic device may provide the user with a simple and interesting interactive operating mode based on the deformable character of itself, thereby improving the use experience of the user.

Moreover, since the functions being the same as that of physical keys or touch-control keys on the conventional electronic device may be achieved directly based on the deformation, no or least physical key (or touch-control key) is needed to be provided for the electronic device, and thus the expense of opening mould for providing physical keys may be reduced and the production cost is reduced. Additionally, since no or least key is provided on the surface of the electronic device, physical space inside the electronic device is saved to accommodate other functional components and thus more functions may be achieved by the electronic device. Also, the integration of the electronic device may be improved to prevent dust from entering into the electronic device, and the user's requirement for surface aesthetics may be satisfied.

Furthermore, when the user desires to achieve a certain function by the electronic device, the user just needs to operate the electronic device directly to deform the electronic device accordingly. Therefore, the operations operated by the user are simplified, and the quality and speed of information interaction between the user and the electronic device is improved.

To make the object, technical solutions and advantages of the disclosure more clear, the technical solutions in the embodiments of the disclosure are described clearly and completely in conjunction with the drawings of the embodiments of the disclosure hereinafter. Apparently, the described embodiments are only a part of the embodiments of the present disclosure. All the other embodiments obtained by those skilled in the art based on the embodiments of the present disclosure without creative effort will fall within the scope of protection of the disclosure. The embodiments of the present disclosure and features in the embodiments may be combined in any manner without conflict. Although a logical order is illustrated in the flowchart, the illustrated or described steps may be performed in an order other than the logical order in some cases.

The term 'and/or' herein is only used to describe an association relationship between associated objects, which represent that there may be three relationships. For example, A and/or B may represent three cases that: only A exists, A and B both exist, or only B exists. Additionally, generally the character '/' herein represents a 'or' relationship between former and latter associated objects without special specification.

In the embodiments of the present disclosure, the electronic device has deformability and is capable of being deformed under stress, for example, a deformation may occur in the electronic device due to a force acted on the electronic device by the user.

In the embodiments of the present disclosure, the electronic device may be such as a mobile phone with a flexible screen, a tablet computer with a flexible screen, a laptop computer with a flexible screen, or a flexible wearable electronic device, which is not defined in the disclosure, as long as the electronic device has deformability. It should be noted that other components of the electronic device (such as a battery, a back cover of the mobile phone with the flexible screen) may also be made of flexible materials, and thus a deformation may occur in the body of the electronic device with the deformation in the flexible screen of the electronic device.

For a better understanding of the above technical solutions, the above technical solutions are fully described in conjunction with the drawings and embodiments in the specification hereinafter.

Referring to FIG. 1, an information processing method is provided according to an embodiment of the disclosure, which may be applied to an electronic device capable of being deformed under stress. A main flowchart of the method is described as follows, which includes steps 101 to 104.

In step 101, the electronic device detects a first deformation occurs in an electronic device.

Once a deformation occurs, the deformation may be detected by the electronic device. Various deformations may occur on the electronic device. Each of deformations may correspond to one shape of the electronic device, and the first deformation is one of the various deformations of the electronic device.

In a specific implementation process, the electronic device may determine the first deformation based on a pressure detected by a pressure sensor. For example, it may be determined that the first deformation is which kind of deformation depending on an amount and/or a direction of the pressure. The pressure sensor may be associated with the flexible materials of the electronic device, and the type of the pressure sensor may be selected depending on the flexible materials of the electronic device, such that the pressure generated due to an operation performed on the flexible materials may be detected. Additionally, in order that the pressure gotten on the electronic device can be detected by the electronic device completely and accurately, the pressure sensor may include multiple sensing units which are distributed at different locations in the electronic device. The pressure gotten on different parts of the electronic device may be detected by using the multiple sensing units, a total pressure is determined, and it is judged that the first deformation is which kind of deformation depending on the determined total pressure.

Generally the first deformation of the electronic device occurs as the user's requirement, that is, the first deformation of the electronic device occurs during the use of the electronic device by the user. Therefore, the first deformation may be a deformation that occurs in the electronic device because of the user operating the electronic device.

Optionally, in the embodiment of the disclosure, the process of detecting a first deformation occurs in an electronic device may include:

detecting to obtain a first operation for changing a shape of the electronic device, where the first operation is an operation operated on the electronic device under an external force; and determining that the first deformation corresponding to the first operation occurs in the electronic device in response to the first operation.

The first deformation occurs in the electronic device under an external force, and the external force may be generated from the first operation performed by the user on the electronic device. The first operation may be such as a bending operation, a crimping operation, or a pressing operation, and so on. In this case, the first deformation may occurs in the electronic device in the case that an operation is performed on the electronic device on the purpose of the user, which may satisfy the user's requirement.

In step 102, first deformation information corresponding to the first deformation is determined.

Once the first deformation is detected, the electronic device determines the first deformation information corresponding to the first deformation. The first deformation occurs because of an operation of the user, and the electronic device determines the corresponding information based on the change of physical shape of the electronic device itself, so that a processor in the electronic device can performs such as an identification operation, a classification operation, or a processing operation, and so on. Further, the user's purpose is clear for the processor, in order that the processor controls the electronic device to perform subsequent operations or perform a certain function.

Optionally, in the embodiment of the disclosure, the first deformation information may include one or more of a location of the first deformation, a direction of the first deformation and an amount first deformation. Several types of possible deformation information are illustrated as examples herein. The first deformation information may further include other possible deformation information of the electronic device, which is not listed herein.

In the case that the first deformation information is a different type of deformation information, the first deformation information determined by the electronic device based on the first deformation is different. Several examples are given for illustration below.

Example 1

Optionally, in the embodiment of the disclosure, in the case that the first deformation information includes the location of the first deformation, the process of determining first deformation information corresponding to the first deformation may include:

determining that the location of the first deformation is in at least one corner of the electronic device, and/or, determining that the location of the first deformation is on at least one edge of the electronic device.

In the embodiment of the disclosure, it is described mainly that, the location of the deformation is determined by the electronic device in the case that the first deformation information includes the location of the first deformation.

In a specific implementation process, the location where the deformation of the electronic device occurs may be a corner or an edge. Given that the electronic device is a mobile phone, the edge may include four side edges of the mobile phone, and the corners may include an upper left corner, a lower left corner, an upper right corner and a lower right corner of the mobile phone. In the case that the location of the deformation is in a corner or at an edge, a deformation on the display screen of the electronic device may be avoided as far as possible, and thus the influence on the displayed content is avoided, and the normal use by the user is not affected as far as possible.

The user may perform a bending operation, a crimping operation or a pressing operation on the edge or the corner of the mobile phone, such that a deformation of the electronic device occurs at the certain edge or corner. The electronic device may perform different functions depending on different locations of the deformation. For example, a main menu may be directly returned to in the case that the upper left corner of the electronic device is bent; for another example, the volume may be increased in the case that the right side edge of the electronic device is pressed over a predetermined extent; a camera may be turned on quickly in the case that the lower left corner of the electronic device is bent twice continuously, and so on. In a specific implementation process, a deformation occurring at one part of the electronic device, deformations occurring at several parts of the electronic device simultaneously, or deformations occurring at several parts of the electronic device in a predetermined manner, may correspond to different functions to be performed, which may be predetermined as user's different requirement depending on the characters of the electronic device. The predetermination not only may be performed by the electronic device itself, but also may be performed by the user, which is not defined herein.

Example 2

Optionally, in an embodiment of the disclosure, the process of determining first deformation information corresponding to the first deformation may include:

determining the direction of the first deformation as a first direction, where the first direction is a direction from a back side of the electronic device to a front side of the electronic device, and the front side is a surface of the electronic device where a display unit of the electronic device is located.

In the embodiment of the disclosure, it is described mainly that, the direction of the deformation is determined by the electronic device in the case that the first deformation information includes the direction of the first deformation.

In the case that the user bends the upper right corner of the electronic device, there may be different bending directions, and different bending directions may correspond to different functions. For example, the volume may be turned up in the case that the user bends the upper right corner of the electronic device in a first direction (such as a direction from the display unit to the display screen of the electronic device), or the volume may be turned down in the case that the user bends the upper right corner of the electronic device in a direction opposite to the first direction (such as a direction from the display unit to the back cover of the electronic device). Even if an operation is performed on the same location on the electronic device, different directions of the operation may also correspond to different functions. In this case, the electronic device may perform more functions based on the limited locations of the deformation, and thus the operability of the electronic device is enhanced, the user may personalize the electronic device as own requirement, and the use requirement of the user is satisfied.

Example 3

In a specific implementation process, the electronic device may further perform different functions based on amounts of deformation with different extents, or even if the same function is performed, parameters in the function are different. For example, the electronic device may perform a function of increasing volume in the case that the user bends the upper right corner of the electronic device with a first extent; and the electronic device may perform a function of increasing 10% volume in the case that the user bends again the upper right corner of the electronic device with a second extent. In this case, the volume may be adjusted step by step, and thus the precision of adjustment is improved, to satisfy different requirements of different users on the volume.

The above description is just cases determined by the electronic device based on the first deformation in the case that the first deformation information includes the location of the first deformation, the direction of the first deformation or the amount of the first deformation. In the case that the first deformation information includes other deformation information, a similar processing may be performed.

In a specific implementation process, in the process that the electronic device determines the first deformation information based on the first deformation, in order to make the determined deformation information more accurately and satisfy user's expectation, multiple types of deformation information may be taken into account at one time, thereby improving the accuracy of determination.

Figure 2:
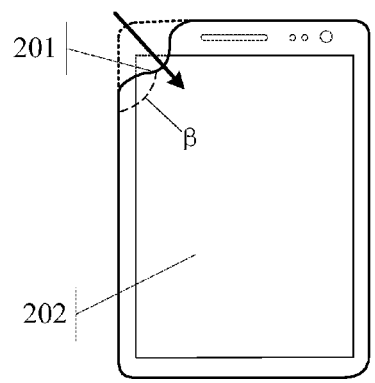
FIG. 2 is a schematic diagram of an electronic device with a first deformation according to an embodiment of the disclosure.

Provided that the electronic device is a mobile phone with a flexible screen, referring to FIG. 2, the user bends the upper left corner 201 of the mobile phone in the direction of arrow shown in FIG. 2, and the extent of the bending may be denoted by an angle formed between the upper left corner 201 and a display unit 202, for example, the extent of the bending is denoted by $\beta$. In this case, the user desires that the electronic device returns to the main menu directly, the upper left corner 201 is the location of the first deformation, the direction of arrow shown in FIG. 2 is the direction of the first deformation, and $\beta$ is the amount of the first deformation. Additionally, the precision of the deformation, the deformable extent, the power consumption of body of the electronic device, the user's requirement and other factors for the electronic device may be synthetically considered, which is not limited in the disclosure.

In step 103, a first instruction corresponding to the first deformation information is determined from multiple predetermined instructions based on correspondences between deformation information and instructions.

Multiple predetermined instructions and multiple types of deformation information may be stored in the electronic device before the first deformation occurs in the electronic device, and each of the deformation information corresponds to an instruction, that is, there is a one-to-one correspondence between the deformation information and the instructions. Once the first deformation occurs, the electronic device may determine the first instruction corresponding to the first deformation information quickly, and may execute the first instruction to achieve a function. The electronic device may achieve a function corresponding to the first deformation directly based on the first deformation, thereby satisfying the user's requirement.

Optionally, in the embodiment of the disclosure, the process of determining a first instruction corresponding to the first deformation information from multiple predetermined instructions based on correspondences between deformation information and the instructions may include:

determining a first function corresponding to the first deformation information, based on correspondences between the deformation information and functions implemented by the electronic device; and determining an executive instruction as the first instruction, wherein the executive instruction is corresponding to the first function and is determined from the plurality of predetermined instructions.

The first instruction is an executive instruction to control the electronic device to execute the first function, and the first function is achieved by the electronic device carrying out the executive instruction.

In a specific implementation process, the user operates the electronic device, such that the first deformation of the electronic device occurs to execute the first function accordingly. There may be various cases, and several cases are described as follows.

First Case

In the first case, the first deformation may indicate that the user uses the electronic device to execute a function corresponding to an operation performed by the user on a physical button (or a touch-control key) of the electronic device. It can be understood that, a first key function corresponding to the first deformation information is determined based on correspondences between the deformation information and key functions implemented by the electronic device; and a key executive instruction is determined as the first instruction, where the key executive instruction is determined from the plurality of predetermined instructions and is corresponding to the first key function. In the embodiment of the disclosure, the first key function is the first function.

In a specific implementation process, the key for executing the first key function by the electronic device may be a physical button, such as a volume button, a shutdown and restart button arranged on a side edge of the electronic device, or may also be a touch-control key, such as a HOME (homepage) key, a MENU (main menu) key arranged on the lower of the display unit of the electronic device and on which a touch-control operation is performed to achieve the functions.

There are two cases that the key for executing the first key function really exists in the electronic device, or the key for executing the first key function does not exist in the electronic device, which are described respectively below.

In the case that the key for executing the first key function really exists, that is, the key is arranged really in the electronic device, the electronic device may implement the same function as that of the key via the first deformation. For example, the key is a HOME key of the electronic device, and the HOME key cannot work correctly due to a failure in the electronic device. In this case, if the user expects the electronic device to implement a HOME function, the user may operate the electronic device to make the first deformation occur in the electronic device, and the electronic device may implement the function of the HOME key via the first deformation. That is, the electronic device may provide the user with a new interactive mode based on the deformable character of the electronic device itself, and the interest in operating may be increased. In the case that the physical key fails or does not work properly, the new interactive mode may replace the physical key timely, and the problem due to hardware failure is solved timely, convenient for the user to use the electronic device, thereby improving the use experience of the user.

In the case that the key does not exist, that is, the key is not arranged really in the electronic device, the electronic device may implement a function directly via the deformation, instead of implementing the function by operating the key. For example, the electronic device may return to the main menu directly based on the first deformation; for another example, the electronic device may increase the volume directly based on the first deformation, and so on. In such alternative way, no or least physical key (or touch-control key) is needed to be provided for the electronic device, and thus the expense of opening mould for providing the keys may be reduced and the production cost is reduced. Additionally, since no or least key is provided on the surface of the electronic device, physical space inside the electronic device is saved to accommodate other functional components. Also, the integration of the electronic device may be improved to prevent dust from entering into the electronic device, and the user's requirement for surface aesthetics may be satisfied.

Second Case

In the second case, the first deformation may indicate that the user expects the electronic device to implement a function corresponding to an operation performed by the user on an application program. It can be understood that, a first operation corresponding to the first deformation information is determined based on correspondences between the deformation information and operations for the application program; and an operating instruction is determined as the first instruction, where the operating instruction is corresponding to the first operation and is determined from the plurality of predetermined instructions. The first operation is an operation performed by the user on a first application installed in the electronic device. In the embodiment of the disclosure, the function implemented by the first application via the first operation is the first function.

In a specific implementation process, the first operation may be a copying operation, a delete operation or a selecting operation performed by the user on some content in the first application. For example, if the user needs to delete a photo, the user may make the first deformation occur in the electronic device directly to delete the photo; for another example, if the user needs to dial a telephone number, the user may make the first deformation occur in the electronic device directly to dial the telephone number.

In the second case, the electronic device may perform some operations on the first application via the first deformation, and thus the electronic device may provide the user with a quick and interesting operating mode, thereby improving the use experience of the user, enhancing the combination character of the electronic device and satisfying the user's requirement.

In step 104, the first instruction is executed.

After the first instruction corresponding to the first deformation is determined, it can be considered that the user's requirement is clear to the electronic device and the electronic device may execute the first instruction to achieve the function expected by the user.

In the embodiments of the disclosure, once it is detected that a first deformation occurs in the electronic device, the electronic device determines first deformation information corresponding to the first deformation, determines a first instruction corresponding to the first deformation information from multiple predetermined instructions, and executes the first instruction to achieve a function. That is, the electronic device can achieve a function directly based on the first deformation. For example, the electronic device may return to a main menu directly based on the first deformation; for another example, the electronic device may increase the volume directly based on the first deformation. In such way, the intelligence and operability of the electronic device is enhanced, and the electronic device may provide the user with a simple and interesting interactive operating mode based on the deformable character of itself, thereby improving the use experience of the user.

Moreover, since the functions being the same as that of physical keys or touch-control keys on the conventional electronic device may be achieved directly based on the deformation, no or least physical key (or touch-control key) is needed to be provided for the electronic device, and thus the expense of opening mould for providing physical keys may be reduced and the production cost is reduced. Additionally, since no or least key is provided on the surface of the electronic device, physical space inside the electronic device is saved to accommodate other functional components and thus more functions may be achieved by the electronic device. Also, the integration of the electronic device may be improved to prevent dust from entering into the electronic device, and the user's requirement for surface aesthetics may be satisfied.

Furthermore, when the user desires to achieve a certain function by the electronic device, the user just needs to operate the electronic device directly to make a deformation occur in the electronic device accordingly. Therefore, the operations operated by the user are simplified, and the quality and speed of information interaction between the user and the electronic device is improved.

In a specific implementation process, in order to reduce the error response rate of the electronic device, before executing the first instruction, the electronic device may judge whether the user is using the electronic device really, that is, the electronic device may judge whether the operation which makes the first deformation occur in the electronic device is performed by the user purposely.

Optionally, in an embodiment of the disclosure, the process of executing the first instruction may include:

detecting, by using a light sensor of the electronic device, an environmental brightness value of an environment where the electronic device is located;

judging whether the environmental brightness value is greater than a predetermined brightness value; and executing the first instruction in the case that the environmental brightness value is greater than the predetermined brightness value.

In the embodiment of the disclosure, it is described mainly that, before executing the first instruction, the electronic device may judge whether the electronic device is in a "pocket mode", that is, the electronic device may judge whether the electronic device is put in a bag by the user. If it is judged that the electronic device is in the bag, it can be considered that the user is not using the electronic device.

In general, in the case that the user puts the electronic device into a clothes pocket, a trousers pocket or a bag, it indicates that the electronic device is not being used by the user. In this case, it can be considered that the first deformation occurs because of forces acted on the electronic device is not expected by the user, the function corresponding to the first instruction is not what the user expects the electronic device to execute, and thus the electronic device does not execute the first instruction. For example, in the case that the electronic device is put in the trousers pocket when the user is on a subway, the first deformation may occur in the electronic device when other passengers touch the electronic device in a crowded since there are too many people in the subway.

In the case that the electronic device is in a small confined space, the intensity of light is low usually. Therefore, it may be judged whether the electronic device is in the "pocket mode" by judging whether the environmental brightness detected by the light sensor is less than a predetermined environmental brightness. It can be considered that the electronic device is in the "pocket mode" in the case that the environmental brightness is less than the predetermined environmental brightness, and the first instruction is not needed to be executed, the electronic device is not needed to implement the function corresponding to the first instruction. In such judgment manner, the error response rate of the electronic device may be reduced, thereby preventing the electronic device from executing the function that the user does not expect. For example, the electronic device is prevented from unlocking automatically in the case that the user put the electronic device in the trousers pocket on the subway, and the power of the electronic device may be saved, thereby reducing the power consumption.

Optionally, in an embodiment of the disclosure, before the process of detecting whether a first deformation occurs in an electronic device, the method may further include:

judging whether the first deformation occurs in the electronic device in a predetermined period of time starting from a first moment, where first information indicating that the first deformation is required to occur in the electronic device is displayed on a display unit of the electronic device at the first moment; and generating and outputting prompt information in the case that the first deformation does not occur in the electronic device in the predetermined period of time starting from the first moment, where the prompt information is used to prompt a user to perform a second operation and the second operation is an operation to make the first deformation occur in the electronic device.

In the embodiment of the disclosure, it is described mainly that, in the case that the user expects the electronic device to implement a specified function via the first deformation, but the user forgets an operation needed for the electronic device to implement the specified function, the electronic device can prompt the user timely.

In the case that the deformation corresponding to the function of increasing the volume for the electronic device is the crimping of the upper left corner of the electronic device, it can be considered that "crimping of the upper left corner" is a second operation. In the case that information on "increase the volume" is displayed on the display unit of the electronic device, and the deformation does not occur in the electronic device over such as 10 S, it may be considered by the electronic device that the user forgets the second operation, and the electronic device may prompt the user with prompt information. For example, the electronic device outputs a voice of "bend the upper left corner" to prompt the user to perform the second operation timely, which is convenient for the user. There may be other ways for outputting the prompt information, which is not limited herein. By means of such prompting, the prompt function of the electronic device is enhanced, and it's convenient for the user to operate the electronic device.

An embodiment of the disclosure provides an electronic device capable of being deformed under stress, the electronic device may include:

a first processing unit configured to determine first deformation information corresponding to a first deformation;

a second processing unit configured to generate a first instruction corresponding to the first deformation information; and a third processing unit configured to executing the first instruction.

In one embodiment of the disclosure, the first processing unit may include a detection module, a first determination module, where the detection module is configured to detect to determine that a first deformation occurs in the electronic device, and the first determination module is configured to determine first deformation information corresponding to the first deformation;

the second processing unit may include a second determination module, where the second determination module is configured to determine a first instruction corresponding to the first deformation information from a plurality of predetermined instructions based on correspondences between deformation information and the instructions; and the third processing unit may include an execution module, where the execution module configured to execute the first instruction.

Figure 3:
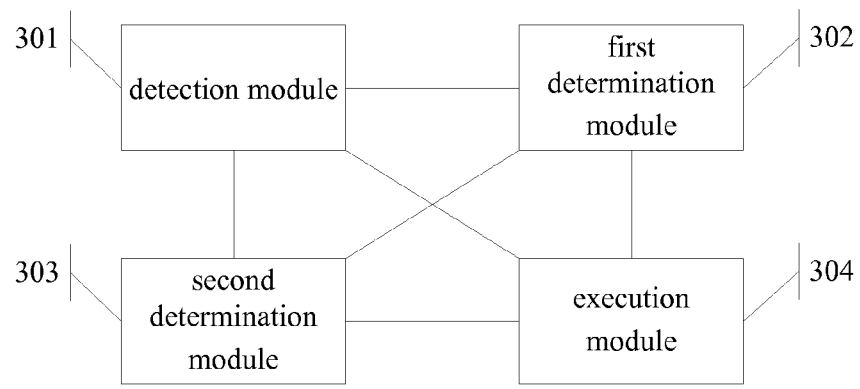
FIG. 3 is a schematic main structural diagram of an electronic device according to an embodiment of the disclosure.

Referring to FIG. 3, an electronic device is further provided according to embodiments of the disclosure based on the same inventive concept, the electronic device is capable of being deformed under stress, and the electronic device includes a detection module 301, a first determination module 302, a second determination module 303 and an execution module 304.

The detection module 301 is configured to detect a first deformation occurs in an electronic device.

The first determination module 302 is configured to determine first deformation information corresponding to the first deformation.

The second determination module 303 is configured to determine a first instruction corresponding to the first deformation information from multiple predetermined instructions based on correspondences between deformation information and the instructions.

The execution module 304 is configured to execute the first instruction.

Optionally, in the embodiment of the disclosure, the first deformation information may include one or more of a location of the first deformation, a direction of the first deformation and an amount first deformation amount.

Optionally, in the embodiment of the disclosure, the detection module 301 may be configured to:

detect to obtain a first operation for changing a shape of the electronic device, where the first operation is an operation operated on the electronic device under an external force; and determine that the first deformation corresponding to the first operation occurs in the electronic device in response to the first operation.

Optionally, in the embodiment of the disclosure, in the case that the first deformation information includes the location of the first deformation, the first determination module 302 may be configured to:

determine that the location of the first deformation is in at least one corner of the electronic device, and/or, determine that the location of the first deformation is on at least one edge of the electronic device.

Optionally, in the embodiment of the disclosure, in the case that the first deformation information includes the direction of the first deformation, the first determination module 302 may be configured to:

determine the direction of the first deformation as a first direction, where the first direction is a direction from a back side of the electronic device to a front side of the electronic device, and the front side is a surface of the electronic device where a display unit of the electronic device is located.

Optionally, in the embodiment of the disclosure, the second determination module 303 may be configured to:

determine a first function corresponding to the first deformation information, based on correspondences between the deformation information and functions implemented by the electronic device; and determine an executive instruction as the first instruction, where the executive instruction is corresponding to the first function and is determined from the plurality of predetermined instructions.

Optionally, the execution module 304 may be configured to:

detect, by using a light sensor of the electronic device, an environmental brightness value of an environment where the electronic device is located;

judge whether the environmental brightness value is greater than a predetermined brightness value; and execute the first instruction in the case that the environmental brightness value is greater than the predetermined brightness value.

Figure 4:
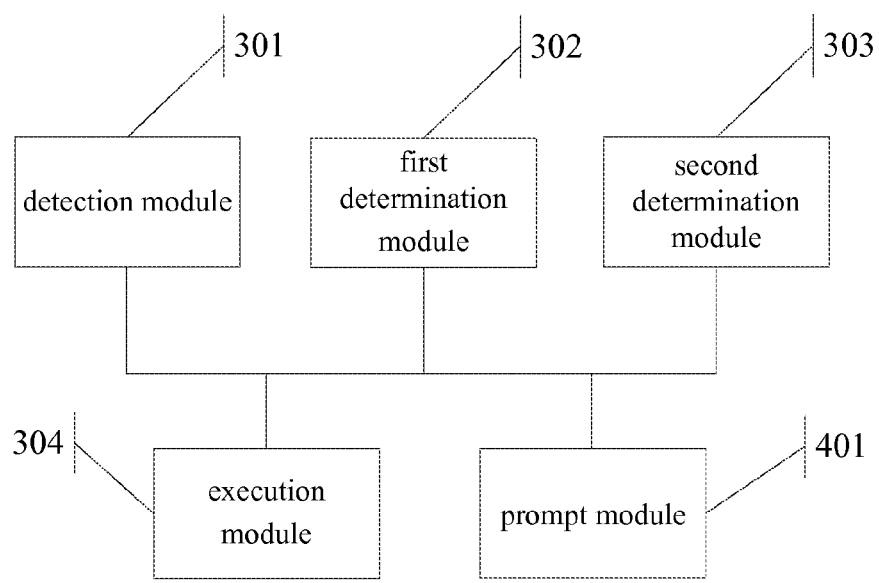
FIG. 4 is a schematic main structural diagram of an electronic device according to an embodiment of the disclosure.

Optionally, in the embodiment of the disclosure, referring to FIG. 4, the electronic device may further include a prompt module 401 configured to:

before the detection module 301 detects to determine that a first deformation occurs in the electronic device, the detection module 301 judges whether the first deformation occurs in the electronic device in a predetermined period of time starting from a first moment, where first information indicating that the first deformation is required to occur in the electronic device is displayed on a display unit of the electronic device at the first moment; and generate and output prompt information in the case that the first deformation does not occur in the electronic device in the predetermined period of time starting from the first moment, where the prompt information is used to prompt a user to perform a second operation and the second operation is an operation to make the first deformation occur in the electronic device.

In the embodiments of the disclosure, once it is detected that a first deformation occurs in the electronic device having deformability, the electronic device determines first deformation information corresponding to the first deformation, determines a first instruction corresponding to the first deformation information from multiple predetermined instructions, and executes the first instruction to achieve a function. That is, the electronic device can achieve a function directly based on the first deformation. For example, the electronic device may return to a main menu directly based on the first deformation; for another example, the electronic device may increase the volume directly based on the first deformation. In such way, the intelligence and operability of the electronic device is enhanced, and the electronic device may provide the user with a simple and interesting interactive operating mode based on the deformable character of itself, thereby improving the use experience of the user.

Moreover, since the functions being the same as that of physical keys or touch-control keys on the conventional electronic device may be achieved directly based on the deformation, no or least physical key (or touch-control key) is needed to be provided for the electronic device, and thus the expense of opening mould for providing physical keys may be reduced and the production cost is reduced. Additionally, since no or least key is provided on the surface of the electronic device, physical space inside the electronic device is saved to accommodate other functional components and thus more functions may be achieved by the electronic device. Also, the integration of the electronic device may be improved to prevent dust from entering into the electronic device, and the user's requirement for surface aesthetics may be satisfied.

Furthermore, when the user desires to achieve a certain function by the electronic device, the user just needs to operate the electronic device directly to make a deformation occur in the electronic device accordingly. Therefore, the operations operated by the user of the user are simplified, and the quality and speed of information interaction between the user and the electronic device is improved.

In an embodiment of the disclosure, a display unit of an electronic device is made of flexible materials and capable of being bent at an angle within a predetermined angle range. A part of the display unit which is bent relative to a reference plane may be detected, a first display region corresponding to the bent part of the display unit may be determined, and an identifier of a current running application program is displayed on the first display region. The electronic device is controlled and operated by utilizing the bendable character of the display unit, the character of a flexible screen is utilized fully, and thus the flexible screen works well, thereby increasing the utilization rate.

Figure 5:
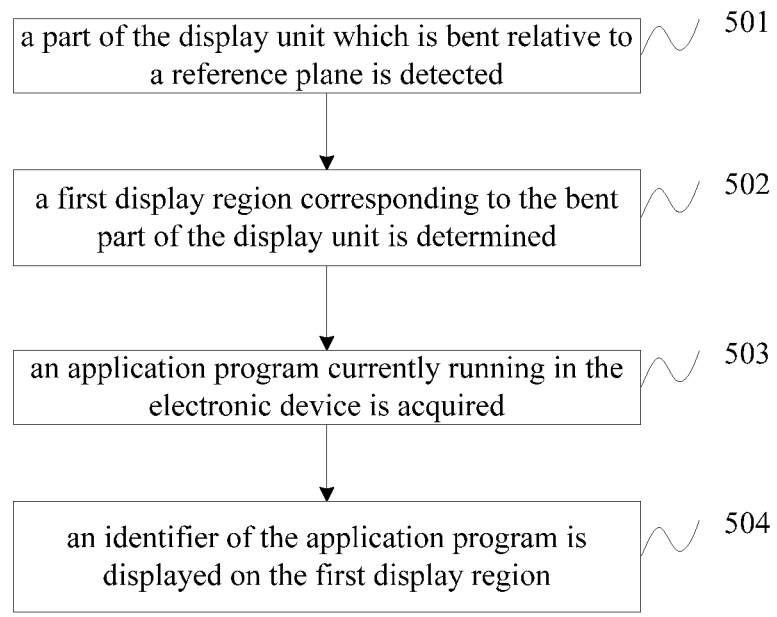
FIG. 5 is a flowchart of an information processing method according to an embodiment of the disclosure.

FIG. 5 is a flowchart of a information processing method according to an embodiment of the disclosure. The technical solution according to the embodiment of the disclosure is applied to an electronic device, and the electronic device includes a display unit made of flexible materials and capable of being bent at an angle within a predetermined angle range.

In practice, the display unit may be a flexible screen. The flexible screen may be bendable and have good flexibility, and the durability of the flexible screen is greater than that of the conventional screen, thereby reducing a probability of accidental damage for the device.

The method may include the following steps 501 to 504.

In step 501, a part of the display unit which is bent relative to a reference plane is detected.

The reference plane is a plane parallel with the display unit before the display unit is bent.

The display unit when being not bent is located in a plane, and the plane or any one of other planes parallel with the plane may be used as the reference plane.

Once the display unit is bent, the bent part of the display unit may be determined, compared with the reference plane.

In step 502, a first display region corresponding to the bent part of the display unit is determined.

In step 503, an application program currently running in the electronic device is acquired.

In step 504, an identifier of the application program is displayed on the first display region.

The display unit corresponds to a display region, and the first display region corresponding to the bent part of the display unit may be determined based on the bent part.

In the embodiment of the present disclosure, the first display region is used to display the identifier of the application program.

The identifier of the application program is used to uniquely identify the application program, and the content of the application program indexed by the identifier of the application program may be output on the display unit by triggering the identifier of the application program. One application program has one identifier.

The identifier of the application program is displayed on the first display region, which is convenient for the user to view the application program currently running and perform a operation. For example, the current display content may be switched to content of an application program by triggering the identifier of the application program.

In the conventional technology, the identifier of the current running application program is displayed by performing a specified operation on a specified control key, and the identifier of the current running application program can only be displayed at a fixed location. Therefore, the operation is inconvenient, and the personal habit and personalized needs of the user cannot be satisfied.

In the embodiment of the disclosure, based on the bendable character of the display unit, the display unit may be bent to trigger the bending of a certain region of the display unit in the case that the identifier of the current running application program is needed to be displayed for the user, and the user may bend the part of the display unit which meets a habit of the user for display, and thus the identifier of the application program may be displayed on the first display region. The first display region is a display region meeting the habit of the user, convenient to operate or view for the user.

Figure 6A:
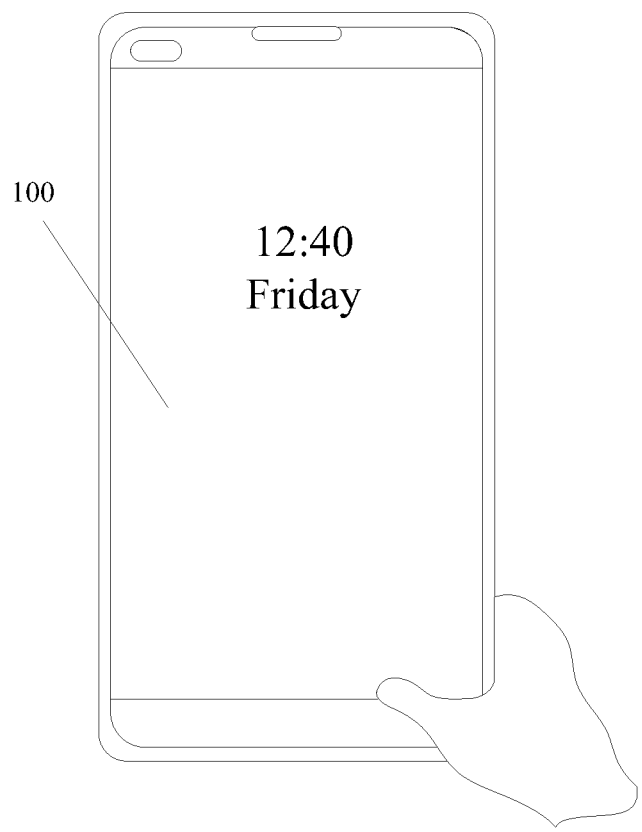
FIG. 6a is a schematic diagram of a display on a display unit according to an embodiment of the disclosure.
Figure 6B:
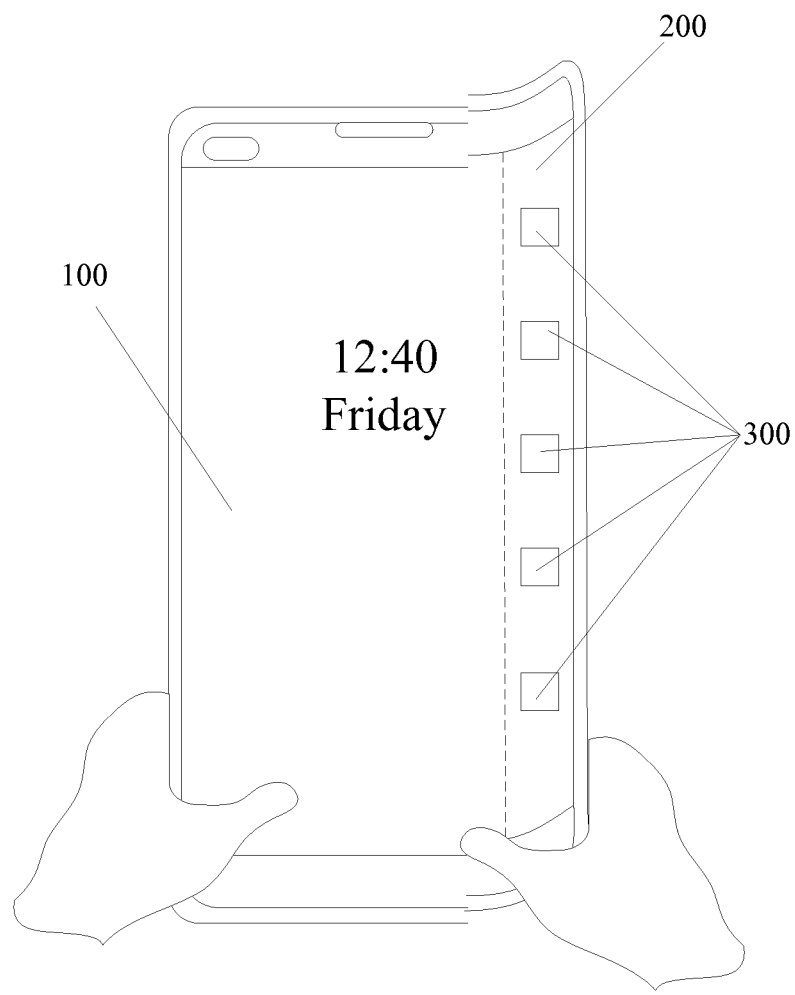
FIG. 6b is a schematic diagram of another display on a display unit according to an embodiment of the disclosure.

FIG. 6a illustrates a schematic diagram of a showing of the display unit being parallel with the reference plane before the display unit of the electronic device is bent relative to the reference plane, and FIG. 6b illustrates a schematic diagram of a showing of the display unit after the display unit of the electronic device is bent relative to the reference plane.

As shown in FIG. 6a and FIG. 6b, an identifier 300 of the current running application program is displayed on the first display region 200 on the display unit 100. The first display region 200 is located in the part of display unit which is bent relative to the reference plane.

In the embodiment of the present disclosure, the character of the flexible screen is utilized fully, thereby increasing the utilization rate of the electronic device.

Figure 7:
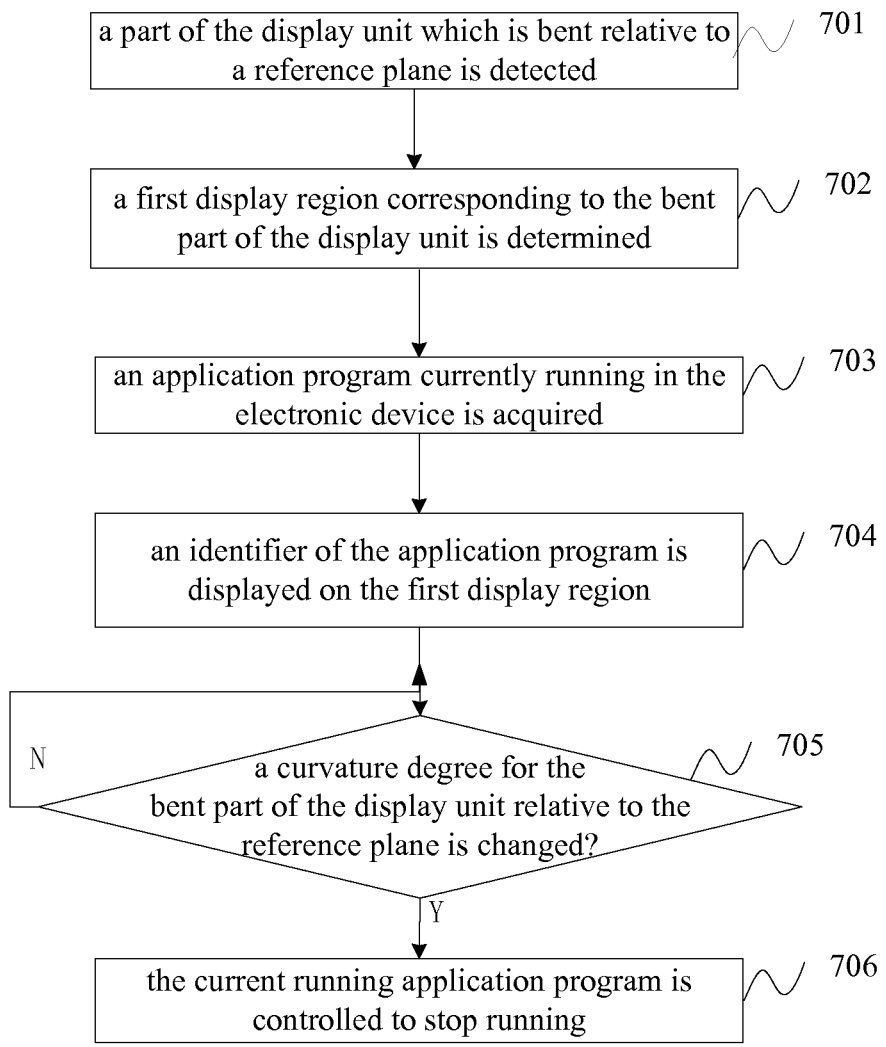
FIG. 7 is a flowchart of an information processing method according to another embodiment of the disclosure.

After the identifier of the current running application program is displayed on the first display region, there are various possible implementation ways of executing the control and operation. As a possible implementation way, the information processing method according to another embodiment of the present disclosure may include steps 701 to 706, as shown in FIG. 7.

In step 701, a part of the display unit which is bent relative to a reference plane is detected, where the reference plane is a plane parallel with the display unit before the display unit is bent.

In step 702, a first display region corresponding to the bent part of the display unit is determined.

In step 703, an application program currently running in the electronic device is acquired.

In step 704, an identifier of the application program is displayed on the first display region.

Steps 701 to 704 may refer to the description of steps 501 to 504, which is not repeated any more herein.

In step 705, it is detected whether a curvature degree for the bent part of the display unit relative to the reference plane is changed; step 706 is performed, if the curvature degree is changed.

In step 706, the current running application program is controlled to stop running in the case that a change of the curvature degree is greater than a predetermined value.

After the identifier of the current running application program is displayed on the first display region, the application program may be triggered to stop running, to save memory of the electronic device.

The user may trigger the application program to stop running by changing the curvature degree of the display unit.

In order to improve the accuracy of operation and avoid a mistaken operation, the curvature degree for the bent part of the display unit relative to the reference plane may be detected, and the current running application program may be controlled to stop running in the case that the change of the curvature degree is greater than the predetermined value.

As other possible implementation ways, the current running application program may be controlled to stop running in the case where it is detected that the display unit is switched from a bent state in which the display unit is bent relative to the reference plane to a parallel state in which the display unit is parallel with the reference plane; or the current running application program may be controlled to stop running in the case where it is detected that the display unit is switched from the bent state to the parallel state and then switched again from the parallel state to the bent state.

Since the display unit made of flexible materials is prone to be bent, to avoid some mistaken operations, in another embodiment, firstly it may be judged whether the bent part of the display unit meets a first predetermined condition in the case that the display unit is bent relative to the reference plane, to ensure that the operation is performed only on the bent part which meets the first predetermined condition, and the mistaken operation is avoided.

The first predetermined condition may be set in various possible ways, for example, the first predetermined condition may be set based on a direction in which the display unit is bent relative to the reference plane, a curvature degree, a bent location and the like.

Figure 8:
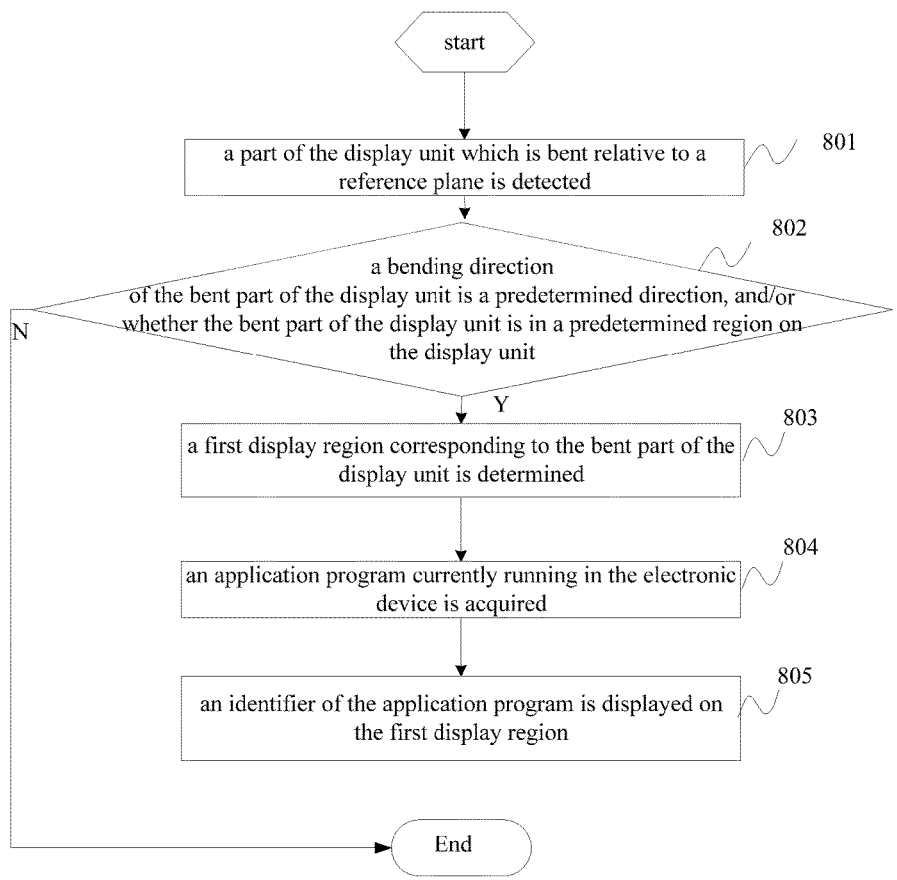
FIG. 8 is a flowchart of an information processing method according to another further embodiment of the disclosure.

In a possible implementation way, the information processing method according to another embodiment of the present disclosure may include steps 801 to 805, as shown in FIG. 8.

In step 801, a part of the display unit which is bent relative to a reference plane is detected.

The reference plane is a plane parallel with the display unit before the display unit is bent.

In step 802, it is judged whether a bending direction of the bent part of the display unit is a predetermined direction, and/or whether the bent part of the display unit is in a predetermined region on the display unit. Step 803 is performed if the bending direction is the predetermined direction, and the bent part is in the predetermined region; otherwise, the process ends.

In step 803, a first display region corresponding to the bent part of the display unit is determined.

In step 804, an application program currently running in the electronic device is acquired.

In step 805, an identifier of the application program is displayed on the first display region.

After the identifier of the current running application program is displayed on the first display region, it is detected whether the curvature degree for the bent part of the display unit relative to the reference plane is changed, and the current running application program is controlled to stop running in the case that the change of the curvature degree is greater than the predetermined value.

Additionally, the current running application program may be controlled to stop running in the case where it is detected that the display unit is switched from a bent state in which the display unit is bent relative to the reference plane to a parallel state in which the display unit is parallel with the reference plane; or the current running application program may be controlled to stop running in the case where it is detected that the display unit is switched from the bent state to the parallel state and switched from the parallel state to the bent state again.

The predetermined direction may be a direction pointing to the display content of the display unit.

The predetermined region may be in a region on both sides of the display unit. In the case that the electronic device is a portable mobile device, the both sides of the display unit, also being both sides of the electronic device, are convenient to be operated for the user. For example, when holding a mobile phone, the user may bend the display unit on the both sides conveniently. The both sides of the display unit are two boundaries parallel with the direction of the display content on the display unit.

The predetermined region may also be a region on the display unit including any one of four boundaries of the display unit.

Since the display unit may be bent randomly, in order to avoid the mistaken operation and reduce the amount of calculation, in another embodiment, the electronic device may include at least a first operating mode and a second operating mode, and the first operating mode is different from the second operating mode. The part of the display unit which is bent relative to the reference plane is detected only in the case that the electronic device is in the second operating mode. If the electronic device is in any operating mode other than the second operating mode, the bent part of the display unit is not detected.

The bending of the display unit may be detected and the corresponding operation is performed only in the case that the electronic device is in the second operating mode.

In the case that the electronic device is needed to be operated by bending the display unit, the electronic device may be triggered to be switched into the second operating mode. If the part of the display unit which is bent relative to the reference plane is detected in the second operating mode, the identifier of the current running application program is displayed on the first display region corresponding to the bent part.

It may be determined whether the electronic device is switched into the second operating mode by detecting whether there is an input operation meeting a second predetermined condition.

The electronic device is switched into the second operating mode in the case that the input operation meeting the second predetermined condition is detected; otherwise, the operating mode of the electronic device is not switched.

The input operation meeting the second predetermined condition may be a triggering operation to a specified control key of the electronic device, or an input operation including a specific content, for example, inputting a certain password.

In the case that the electronic device is in the second operating mode, the electronic device may be switched from the second operating mode into other operating mode once an input operation meeting a third predetermined condition is detected.

The input operation meeting the third predetermined condition and the input operation meeting the second predetermined condition may both be such as the triggering operation to a specified control key of the electronic device.

For sake of simplicity, the above method embodiments are described in a series of group actions, but it should be known by those skilled in the art that the disclosure is not limited to the described order of actions, and some steps may be performed simultaneously or in a different order in the disclosure. Also, it should be known by those skilled in the art that the embodiments described in the specification are preferred embodiments, and the included actions and modules are not necessary in the disclosure.

In one embodiment of the disclosure, in the electronic device illustrated as before, the first processing unit may include a bending detection module and a region determination module, where the bending detection module is configured to detect a part of a display unit which is bent relative to a reference plane, where the reference plane is a plane parallel with the display unit before the display unit is bent, and the region determination module is configured to determine a first display region corresponding to the bent part of the display unit;

the second processing unit may include an application acquisition module, where the application acquisition module is configured to acquire an application program currently running in the electronic device; and the third processing unit may include a display trigger module, where the display trigger module is configured to display an identifier of the application program on the first display region.

Figure 9:
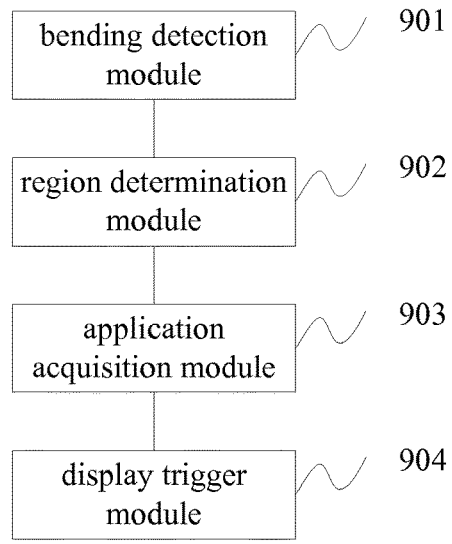
FIG. 9 is a schematic structural diagram of an electronic device according to an embodiment of the disclosure.

FIG. 9 is a schematic structural diagram of an electronic device according to an embodiment of the disclosure.

The electronic device may include a bending detection module 901, a region determination module 902, an application acquisition module 903 and a display trigger module 904.

The bending detection module 901 is configured to detect a part of the display unit which is bent relative to a reference plane.

The reference plane is a plane parallel with the display unit before the display unit is bent.

The display unit when being not bent is located in a plane, and the plane and any one of other planes parallel with the plane may be used as the reference plane.

Once the display unit is bent, the bent part of the display unit may be determined, compared with the reference plane.

The region determination module 902 is configured to determine a first display region corresponding to the bent part of the display unit.

The application acquisition module 903 is configured to acquire an application program currently running in the electronic device.

The display trigger module 904 is configured to display an identifier of the application program on the first display region.

In the embodiment of the present disclosure, the character of the flexible screen is utilized fully, thereby increasing the utilization rate of the electronic device.

Figure 10:
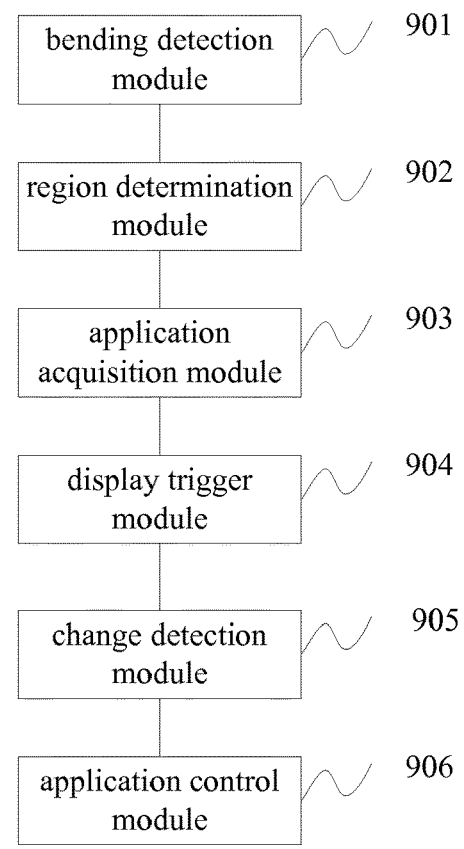
FIG. 10 is a schematic structural diagram of an electronic device according to another embodiment of the disclosure.

After the identifier of the current running application program is displayed on the first display region, there are various possible implementation ways of executing the control and operation. As a possible implementation way, the electronic device according to another embodiment of the present disclosure may further include a change detection module 905 and an application control module 906, as shown in FIG. 10.

The change detection module 905 is configured to detect whether a curvature degree for the bent part of the display unit relative to the reference plane is changed.

The application control module 906 is configured to control the application program to stop running in the case that a change of the curvature degree is greater than a predetermined value.

After the identifier of the current running application program is displayed on the first display region, the application program may be triggered to stop running to save memory of the electronic device.

The user may trigger the application program to stop running by changing the curvature degree for the display unit.

In order to improve the accuracy of operation and avoid a mistaken operation, the curvature degree for the bent part of the display unit relative to the reference plane may be detected, and the current running application program may be controlled to stop running in the case that the change of the curvature degree is greater than the predetermined value.

As other possible implementation ways, the electronic device may control the current running application program to stop running, when detecting that the display unit is switched from a bent state in which the display unit is bent relative to the reference plane to a parallel state in which the display unit is parallel with the reference plane; or the electronic device may control the current running application program to stop running, when detecting that the display unit is switched from the bent state to the parallel state and switched from the parallel state to the bent state again.

Since the display unit made of flexible materials is prone to be bent, to avoid some mistaken operations, in another embodiment, the region determination module may include:

a judgment sub-module configured to judge whether the bent part of the display unit meets a first predetermined condition; and a determination sub-module configured to determine the first display region corresponding to the bent part of the display unit in the case that the bent part of the display unit meets the first predetermined condition.

The first predetermined condition may be set in various possible ways. In a possible implementation way, the judgment sub-module may be configured to:

judge whether a bending direction of the bent part of the display unit is a predetermined direction, and/or whether the bent part of the display unit is in a predetermined region on the display unit.

The predetermined direction may be a direction pointing to the display content of the display unit.

The predetermined region may be in a region on both sides of the display unit. In the case that the electronic device is a portable mobile device, the both sides of the display unit, also being both sides of the electronic device, are convenient to be operated for the user. For example, when holding a mobile phone, the user may bend the display unit on the both sides conveniently. The both sides of the display unit are two boundaries parallel with the direction of the display content on the display unit.

The predetermined region may also be a region on the display unit including any one of four boundaries of the display unit.

Since the display unit may be bent randomly, in order to avoid the mistaken operation and reduce the amount of calculation, in another embodiment, the electronic device may include at least a first operating mode and a second operating mode, and the first operating mode is different from the second operating mode. The bending detection module may detect the part of the display unit which is bent relative to the reference plane only in the case that the electronic device is in the second operating mode.

In the case that the electronic device is needed to be operated by bending the display unit, the electronic device may be triggered to be switched into the second operating mode. If the part of the display unit which is bent relative to the reference plane is detected only in the second operating mode, the identifier of the current running application program is displayed on the first display region corresponding to the bent part.

In order to achieve the switching of operating modes, the electronic device according to an embodiment of the disclosure may further include:

a mode switch module configured to switch the electronic device into the second operating mode, in the case that an input operation meeting a second predetermined condition is detected.

The input operation meeting the second predetermined condition may be a triggering operation to a specified control key of the electronic device, or an input operation including a specific content, for example, inputting a certain password.

The mode switch module may further configured to switch the electronic device from the second operating mode into other operating modes once an input operation meeting a third predetermined condition is detected in the case that the electronic device is in the second operating mode.

The input operation meeting the third predetermined condition and the input operation meeting the second predetermined condition may both are such as the triggering operation to a specified control key of the electronic device.

In the embodiments of the present disclosure, a flexible character of the display unit of the electronic device may be utilized fully, the electronic device may be protected by utilizing the characters of durability and low damage probability of the display unit, the electronic device is easy to carry, and the electronic device may be controlled by utilizing the flexible character. Therefore, the flexible screen works well, thereby increasing the utilization rate.

It should be clearly known by those skilled in the art that, for the convenience and simplicity of description, the functional modules described above are illustrated as examples. In practice, different functional units may be configured to achieve the above functions as required, that is, the internal structure of the device may be divided into different functional units, to achieve all or part of the functions described above. The specific operational process of the system, device and units described above may refer to the corresponding process in the method embodiments described above, which is not repeated any more herein.

It should be understood that, in the embodiments according to the present application, the disclosed system, device and method may be implemented in other ways. The above-mentioned device embodiments according to the disclosure are only illustrative. For example, the division in unit is only a logical division of functions and other kinds of division are possible in practice. For example, multiple units or components may be combined together or may be integrated in another system; or some features may be omitted or not implemented. Furthermore, the coupling, directly coupling or communication connection between the components shown or discussed may be indirectly coupling or communication connection between devices or units via some interfaces and may be electrical, mechanical or in other form.

The units described as separate components may be or may not be physically separated. The component displayed as the display unit may be or may not be a physical unit, i.e. may be located in one place or be distributed to multiple network units. The object of the solution of the embodiments may be achieved as required by some or all of the units.

Furthermore, the functional units in the embodiments of the disclosure may be all integrated in a processing unit; or the functional units may be each operates as a unit; or two or more of the functional units may be integrated in a unit. The integrated unit may be implemented in the form of hardware or in the form of hardware together with software.

The above integrated unit in the disclosure which is implemented in the form of the software function module and which is sold and used as an individual product may also be stored in computer readable storage medium of a computer. On the basis of this understanding, the technical principle of the disclosure or the part of the disclosure contributing to the existing technologies may be embodied in a form of a software product which is stored in a storage medium and which include multiple instructions for instructing a computer device (which may be a personal computer, a server, a network equipment or the like) or a processor to perform all or part of the methods described in the embodiments of the disclosure. The storage medium may include any medium which can store program code, such as a USB flash disk, a removable hard disk, a read-only memory (ROM), a random access memory (RAM), a magnetic disk or an optical disk.

Specifically, computer program instructions corresponding to an information processing method according to the embodiments of the disclosure may be stored in the storage medium such as an optical disk, a hard disk or a USB flash disk. The computer program instructions corresponding to the information processing method stored in the storage medium, when being read or executed by an electronic device capable of being deformed under stress, may include:

detecting whether a first deformation occurs in an electronic device;

determining first deformation information corresponding to the first deformation;

determining a first instruction corresponding to the first deformation information from multiple predetermined instructions based on correspondences between deformation information and the instructions; and executing the first instruction.

Optionally, the first deformation information may include one or more of a location of the first deformation, a direction of the first deformation and an amount of the first deformation.

Optionally, a computer instruction stored in the storage medium corresponding to the step of detecting whether a first deformation occurs in an electronic device, may include:

detecting to obtain a first operation for changing a shape of the electronic device, where the first operation is an operation operated on the electronic device via an external force; and determining that the first deformation corresponding to the first operation occurs in the electronic device in response to the first operation.

Optionally, a computer instruction stored in the storage medium corresponding to the step of determining first deformation information corresponding to the first deformation, when executed, may include, in the case that the first deformation information includes the location of the first deformation: determining that the location of the first deformation is in at least one corner of the electronic device, and/or, determining that the location of the first deformation is on at least one edge of the electronic device.

Optionally, a computer instruction stored in the storage medium corresponding to the step of determining first deformation information corresponding to the first deformation, when executed, may include, in the case that the first deformation information includes the direction of the first deformation: determining the direction of the first deformation as a first direction, where the first direction is a direction from a back side of the electronic device to a front side of the electronic device, and the front side is a surface of the electronic device where a display unit of the electronic device is located.

Optionally, a computer instruction stored in the storage medium corresponding to the step of determining a first instruction corresponding to the first deformation information from multiple predetermined instructions based on correspondences between deformation information and the instructions, when executed, may include:

determining a first function corresponding to the first deformation information, based on correspondences between the deformation information in the correspondences and functions implemented by the electronic device; and determining an executive instruction as the first instruction, where the executive instruction is corresponding to the first function and is determined among the plurality of predetermined instructions.

Optionally, a computer instruction stored in the storage medium corresponding to the step of executing the first instruction, when executed, may include:

detecting, by using a light sensor of the electronic device, an environmental brightness value of an environment where the electronic device is located;

judging whether the environmental brightness value is greater than a predetermined brightness value; and executing the first instruction in the case that the environmental brightness value is greater than the predetermined brightness value.

Optionally, before a computer instruction stored in the storage medium corresponding to the step of detecting whether a first deformation occurs in an electronic device is executed, the computer program instructions may further include:

judging whether the first deformation occurs in the electronic device in a predetermined period of time starting from a first moment, where first information indicating that the first deformation is required to occur in the electronic device is displayed on a display unit of the electronic device at the first moment; and generating and outputting prompt information in the case that the first deformation does not occur in the electronic device in the predetermined period of time starting from the first moment, where the prompt information is used to prompt a user to perform a second operation and the second operation is an operation to make the first deformation occur in the electronic device.

As described above, the technical solutions of the disclosure are introduced in details according to the above embodiments of the disclosure, but the description of the embodiments above only is used to aid the reader in understanding the method according to the disclosure and the core concepts of the disclosure and the scope of the disclosure will not be limited thereto. Any variations or substitutions which can readily occur to those skilled in the art without departing from the spirit of the disclosure shall come into the scope of protection of the disclosure.

The invention claimed is:

1. An information processing method for an electronic device, the method comprising:
    displaying a predetermined image on a display unit, wherein the display unit comprises a single flexible screen;
    detecting a part of the display unit which is bent relative to a reference plane, wherein the reference plane is a plane parallel with the display unit before the display unit is bent;
    determining a first display region in a bent part of the display unit and a second display region in a non-bent part of the display unit;
    acquiring an application program currently running in the electronic device;
    displaying an identifier of the application program on the first display region and displaying the predetermined image on the second display region simultaneously, wherein the identifier of the application program identifies the application program, wherein each application program of the electronic device has a respective identifier; and
    after the displaying of the identifier of the application program on the first display region, controlling the currently running application program to stop running in response to a detection that the bent part of the display unit is bent twice by switching from a bent state to a parallel state and then switching from the parallel state to the bent state again.

2. The method according to claim 1, wherein the first display region corresponding to the bent part of the display unit is determined in response to a determination that the bent part of the display unit meets a first predetermined condition comprising at least one of (i) whether a bending direction of the bent part of the display unit is a predetermined direction, or (ii) whether the bent part of the display unit is in a predetermined region of the display unit.

3. The method according to claim 1, wherein the identifier of the application program identifies only the application program.

4. The method according to claim 1, wherein the identifier of the application program is an only displayed and selectable identifier of the application program.

5. The method according to claim 1, further comprising triggering content of the application program to output the content on the display unit, wherein the content is indexed by the identifier of the application program.

6. The method according to claim 1, wherein the controlling of the currently running application program to stop running is performed in response to the bent part of the display unit being bent twice to prevent mistakenly stopping the running of the application program by bending the bent part of the display unit only once.

7. An electronic device capable of being deformed under stress, wherein the electronic device comprises a sensor, a processor and a memory, wherein the memory has processor-executable instructions stored therein, and wherein the instructions, when executed by the processor, configure the electronic device to:
    display a predetermined image on a display unit, wherein the display unit comprises a single flexible screen;
    determine first deformation information corresponding to a first deformation including
        detecting, via the sensor, a part of the display unit which is bent relative to a reference plane, wherein the reference plane is a plane parallel with the display unit before the display unit is bent, and
        determining a first display region in a bent part of the display unit and a second display region in a non-bent part of the display unit;
    obtain a first instruction corresponding to the first deformation information;
    execute the first instruction,
    wherein the obtaining of the first instruction corresponding to the first deformation information and executing the first instruction comprise
        acquiring an application program currently running in the electronic device, and
        displaying an identifier of the application program on the first display region and displaying the predetermined image in the second display region simultaneously, wherein the identifier of the application program identifies the application program, and wherein each application program of the electronic device has a respective identifier; and
    control the currently running application program to stop running in response to a detection that the bent part of the display unit is bent twice by switching from a bent state to a parallel state and then switching from the parallel state to the bent state again.

8. The electronic device according to claim 7, wherein:
    the sensor is configured to detect a parameter;
    the instructions configure the electronic device to determine that the first deformation occurs in the electronic device based on the parameter; and
    the instructions configure the electronic device to determine the first instruction corresponding to the first deformation information from a plurality of predetermined instructions based on correspondences between a plurality of deformation information and the plurality of predetermined instructions.

9. The electronic device according to claim 8, wherein the first deformation information comprises one or more of a location of the first deformation, a direction of the first deformation and an amount of the first deformation.

10. The electronic device according to claim 9, wherein:
the sensor is configured to detect a first operation for changing a shape of the electronic device, wherein the first operation is an operation operated on the electronic device via an external force; and
the instructions configure the electronic device to determine that the first deformation corresponding to the first operation occurs in the electronic device in response to the detection of the first operation.

11. The electronic device according to claim 10, wherein the first deformation information is the location of the first deformation, the determining of the first deformation information corresponding to the first deformation comprises at least one of (i) determining that the location of the first deformation is in at least one corner of the electronic device, or (ii) determining that the location of the first deformation is on at least one edge of the electronic device.

12. The electronic device according to claim 10, wherein:
the first deformation information is the direction of the first deformation, the determining of the first deformation information corresponding to the first deformation comprises determining the direction of the first deformation as a first direction;
the first direction is a direction from a back side of the electronic device to a front side of the electronic device; and
the front side is a surface of the electronic device where the display unit of the electronic device is located.

13. The electronic device according to claim 7, wherein the first display region corresponding to the bent part of the display unit is determined in response to a determination that the bent part of the display unit meets a first predetermined condition comprising at least on of (i) whether a bending direction of the bent part of the display unit is a predetermined direction, or (ii) whether the bent part of the display unit is in a predetermined region of the display unit.

14. The electronic device according to claim 7, wherein the instructions, when executed by the processor, further configure the electronic device to:
determine an environmental brightness value of an environment where the electronic device is located based on an output of a light sensor of the electronic device; and
execute the first instruction in response to a determination that the environmental brightness value is greater than a predetermined brightness value.

15. The electronic device according to according to claim 14, wherein before the determining of the first deformation information corresponding to the first deformation, the instructions configure the electronic device to:
obtain other information indicating that the first deformation is required to occur; and
generate and output prompt information in response to a determination that the first deformation does not occur in a predetermined period of time starting from a first moment, wherein the other information is displayed at the first moment and the prompt information is for prompting a user to perform an operation to make the first deformation occur.

16. The electronic device according to claim 7, wherein the controlling of the currently running application program to stop running is performed in response to the bent part of the display unit being bent twice to prevent mistakenly stopping the running of the application program by bending the bent part of the display unit only once.

* * * * *